(12) United States Patent
Shrak et al.

(10) Patent No.: US 7,999,198 B2
(45) Date of Patent: Aug. 16, 2011

(54) BABY BATH DEVELOPMENT AND WEIGHING SYSTEM

(75) Inventors: Oren Shrak, Ramat Gan (IL); Jonathan Friedmann, Tel Aviv (IL)

(73) Assignee: Baby Patent Ltd., Ramat Gan (IL)

( * ) Notice: Subject to any disclaimer, the term of this patent is extended or adjusted under 35 U.S.C. 154(b) by 333 days.

(21) Appl. No.: 12/160,513

(22) PCT Filed: Jun. 29, 2006

(86) PCT No.: PCT/IL2006/000758
§ 371 (c)(1),
(2), (4) Date: Jul. 10, 2008

(87) PCT Pub. No.: WO2007/080565
PCT Pub. Date: Jul. 19, 2007

(65) Prior Publication Data
US 2010/0236838 A1    Sep. 23, 2010

Related U.S. Application Data

(60) Provisional application No. 60/758,554, filed on Jan. 13, 2006.

(51) Int. Cl.
| | |
|---|---|
| G01G 19/04 | (2006.01) |
| G01G 21/22 | (2006.01) |
| G01G 23/30 | (2006.01) |
| G01G 23/32 | (2006.01) |
| A47K 3/03 | (2006.01) |
| A47K 3/024 | (2006.01) |
| A61H 33/02 | (2006.01) |

(52) U.S. Cl. .............. 177/25.19; 177/238; 177/245
(58) Field of Classification Search .............. 177/25.19, 177/185, 238–245, 207
See application file for complete search history.

(56) References Cited

U.S. PATENT DOCUMENTS

| | | | | |
|---|---|---|---|---|
| 4,038,973 | A * | 8/1977 | Moore | 600/22 |
| 4,285,411 | A | 8/1981 | Hino et al. | |
| 4,301,879 | A * | 11/1981 | Dubow | 177/5 |
| 4,339,012 | A * | 7/1982 | Vogel et al. | 177/262 |
| 4,347,903 | A * | 9/1982 | Yano et al. | 177/25.13 |
| 4,372,405 | A * | 2/1983 | Stuart | 177/25.14 |
| 4,753,307 | A * | 6/1988 | Muehlenbein | 177/244 |
| 4,873,866 | A * | 10/1989 | Fairbanks | 73/437 |
| 5,172,781 | A * | 12/1992 | Hlavinka et al. | 177/144 |
| 5,173,977 | A * | 12/1992 | Carruth et al. | 5/600 |
| 5,927,142 | A * | 7/1999 | Mercer | 73/296 |
| 6,679,854 | B2 * | 1/2004 | Honda et al. | 600/587 |
| 6,781,067 | B2 * | 8/2004 | Montagnino et al. | 177/25.13 |
| 6,922,856 | B2 | 8/2005 | Mazar | |
| 6,956,175 | B1 | 10/2005 | Daly et al. | |

(Continued)

FOREIGN PATENT DOCUMENTS

GB        2236949 A        4/1991

(Continued)

*Primary Examiner* — Randy W Gibson
(74) *Attorney, Agent, or Firm* — D. Kligler I.P. Services Ltd

(57) ABSTRACT

A weighing system comprising an integrated bathing weighing unit having a container and a sensing arrangement associated with the container and configured to provide data indicative of a weight of a body located within the container.

18 Claims, 8 Drawing Sheets

U.S. PATENT DOCUMENTS

| | | | |
|---|---|---|---|
| 7,170,016 B2 * | 1/2007 | Dumornay et al. | 177/25.13 |
| 7,472,439 B2 * | 1/2009 | Lemire et al. | 5/607 |
| 7,475,595 B1 * | 1/2009 | Tesch | 73/437 |
| 2009/0294184 A1 * | 12/2009 | Gerster et al. | 177/126 |
| 2010/0051353 A1 * | 3/2010 | Swan | 177/25.13 |

FOREIGN PATENT DOCUMENTS

| | | |
|---|---|---|
| GB | 2375181 A | 11/2002 |
| JP | 03-063018 A * | 3/1991 |
| JP | 2003-010277 A * | 1/2003 |
| JP | 2005-190251 A * | 7/2005 |

* cited by examiner

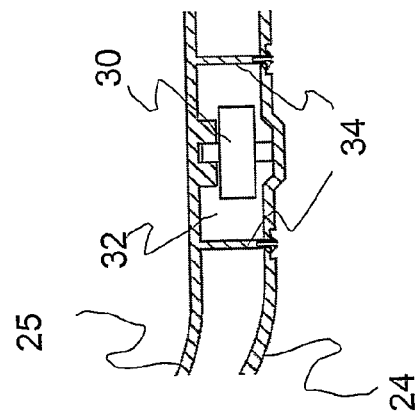
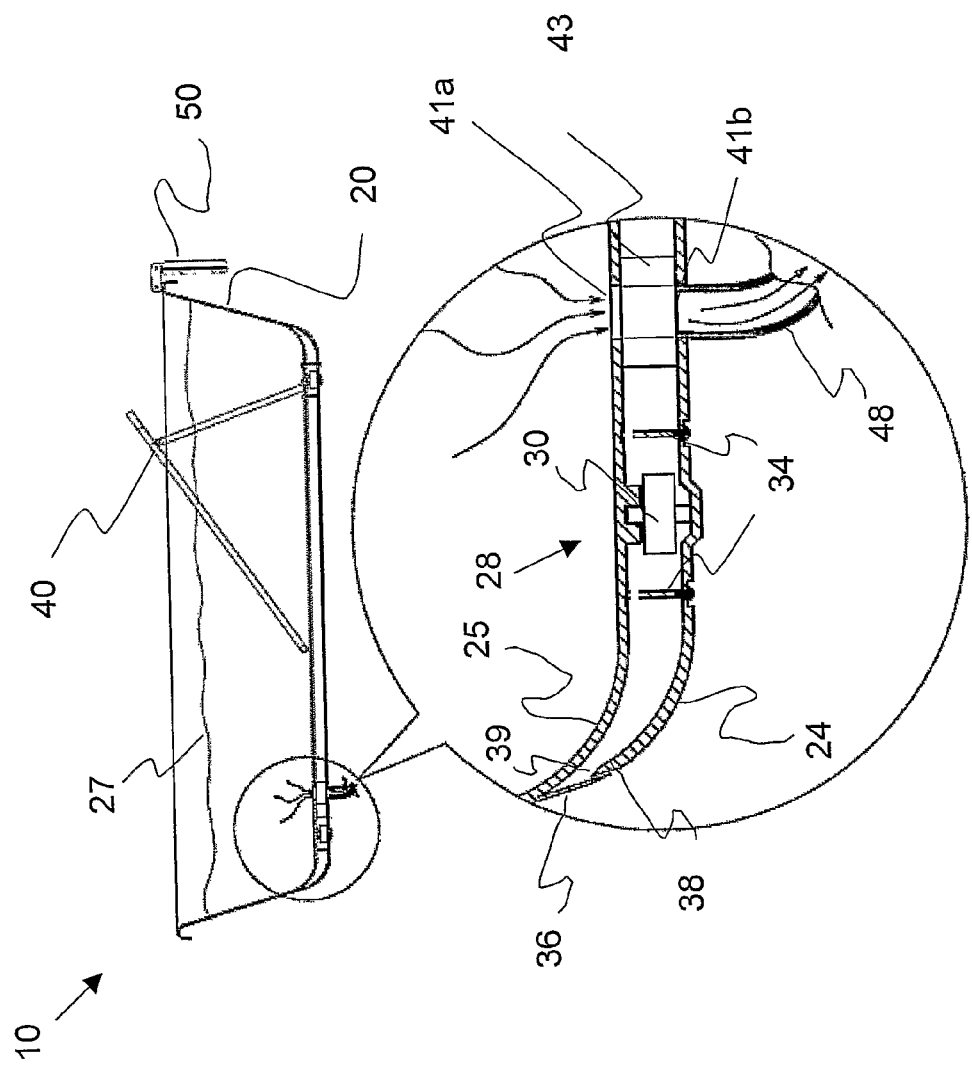
FIG. 1B
FIG. 1A

BABY BATH DEVELOPMENT AND WEIGHING SYSTEM

CROSS-REFERENCE TO RELATED APPLICATION

This application claims the benefit of U.S. provisional application Ser. No. 60/758,554 filed Jun. 26, 2006.

FIELD AND BACKGROUND OF THE INVENTION

The present invention relates to monitoring baby development and, in particular, it concerns monitoring the weight of a baby over time in a baby bath development and weighing system.

In the specification and claims hereinbelow, the term "baby" refers to an infant ranging from birth up until the age of at least one year and older.

It is known that monitoring a baby's weight over time, especially during a period of the first year or two of the baby's life, is a major parameter in understanding the overall development of the baby. Typically, most hospitals weigh a newborn infant immediately after birth and usually daily until the infant is released to its home. Follow up weighing is usually performed in a clinical setting, by a doctor, nurse or other health-care professional, weighing the baby typically once a week or less frequently; in addition to performing other measurements such as measuring baby length and visually inspecting the baby. In most cases, baby weight and other measurements are recorded, along with the age of the baby when respective measurements are taken. Baby development with regard to weight increase over time is tracked against known historical tables for babies, allowing both parents and medical personnel to have a better insight into the normal development of the baby over time.

An example of prior art is McGrigor, in GB Patent no. GB2375181, whose disclosure is incorporated herein by reference, who discloses a system for entering measurement data and information to ascertain whether or not a child is physically developing normally. The system is defined such that it consists of a means for entering measurement data and information appertaining to the object being assessed (typically a human infant or child) and a means for comparing this data and information with stored values against which a qualitative comparison can be made. Typical information may relate to one or more of age, sex and racial type of a human infant or child, while typical measurement data may include weight, height, and head circumference.

In U.S. Pat. No. 6,956,175, whose disclosure is incorporated herein by reference, Daly et al. discloses a scale including an event data discrimination and collection system for continuously monitoring a weight of an infant placed on the scale platen, which may be configured as a bed. Load cells are used to continuously monitor infant weight from the time the infant is placed on the scale platen, so that sudden apparent weight spikes sensed by the load cells but attributable to events involved in patient care may be discarded as artifact, while gradual weight changes reflective of infant physiology are accumulated by the scale controller and used to provide a current weight for the infant weighing apparatus and method for measuring mostly infants and for storing such data, including comparisons of measured vs. stored data. A continuous weighing apparatus is disclosed, which is moveable and which can be located under a bed, for example.

As opposed to occasional baby weighing, a more frequently practiced activity associated with routine baby care and hygiene is that of the baby's bathing. Most babies are bathed usually once a day, and certainly at least a number of times a week, in various baby bath configurations. An exemplary publication concerning a baby bath and bathing is UK Patent Application GB2236949 to Booth, whose disclosure is incorporated herein by reference. Booth discloses a baby bath of molded plastics material which includes a base, a pair of opposed side walls upstanding from the base, and a pair of opposed first and second end walls also upstanding from the base. The first end wall defines an inclined surface on which the head and body of a baby can lie, and the legs of the baby can be supported by an arched portion of the base, which provides more reliable support for a small baby. The bath may be fitted with a water temperature monitor to provide automatic monitoring of water temperature.

Mazar discloses, in U.S. patent application Ser. No. 10/672,568, whose disclosure is incorporated herein by reference, a safety bathtub including at least one upstanding wall; and a built-in thermometer in the wall, the thermometer including a measuring portion and a scale portion, and the thermometer being mounted such that the measuring portion is immersed in water when the bathtub has water in it, and the scale portion is out of the water when the bathtub has water in it, for continual monitoring from outside and above the bathtub.

As previously noted, baby weighing is usually performed in a clinical setting typically once a week, or less frequently, by a healthcare professional weighing the baby, employing systems similar to or such as described hereinabove. As opposed to this, baby bathing is performed rather frequently and normally takes place in the home. Baby baths are widely available for this purpose, and such baths include various configurations similar to and such as described hereinabove. Many responsible parents would prefer to be able to more closely follow the development of their baby's growth, while taking advantage of a home setting to weigh the baby. Whereas many babies experience some discomfort at being undressed, only to be weighed; most babies enjoy being bathed. Furthermore, the frequency and generally pleasant environment associated with bathing the baby offer an opportunity to obtain a relatively large number of baby weight measurements, which may subsequently be used as part of a baby development monitoring system.

There is therefore a need for an economical, reliable, and integrated system in which the baby may be bathed and simultaneously weighed, and in which weight measurement may be recorded and used as part of a baby weight development monitor over time, in a home setting as well as in other settings.

SUMMARY OF THE INVENTION

The present invention is an economical baby bath development and weighing system, wherein a baby may be weighed while it is being bathed and wherein the weight of the baby may be monitored over time.

According to the teachings of the present invention there is provided a baby bath development and weighing system including an integrated bathing weighing unit having a container and a sensing arrangement associated with the container and configured to provide data indicative of a weight of a body located within the container. Most preferably, the container includes a fluid-tight bath liner and a base, and the sensing arrangement comprises an arrangement of sensors located between the base and the bath liner. Preferably, the system further includes a control and processing subsystem connected to the integrated bathing weighing unit and adapted to process signals within the integrated bathing weighing unit. Typically, at least one of the sensors is adapted to provide data indicative of a weight of a baby is a load cell. Further typically, at least one additional sensor is adapted to provide data indicative a temperature of a bathing medium.

Most preferably, the sensors are adapted to provide data according to a sampling rate and wherein time stamp information is associated with respective weight measurement data. Typically, the control and processing subsystem is further adapted to store substantially all weight measurement values obtained during a time period and to determine a spurious weight measurement value from among other weight measurement values of the period. Preferably, the control and processing subsystem is further adapted to calculate an average value of substantially all weight measurement values, to compare the absolute value of the difference of the average value subtracted from each value of the substantially all weight measurement values against a threshold, and to determine the spurious measurement value as any measurement value having the absolute value of the difference larger than the threshold value. Most preferably, the other weight measurement values are considered as representative weight measurement values. Typically, an averaged weight value is calculated from the representative weight measurement values and the averaged weight value is stored as the weight of the body, along with the time stamp information, thereby creating trend information.

Preferably, the control and processing subsystem is further adapted to determine a percentile value of the averaged weight measurement values compared against a known population weight distribution. Typically, the weight of the body is the weight of a baby when the time period is when the baby is bathed in the integrated bathing weighing unit. Further typically, the weight of the body is a weight of a bathing medium, when the time period is before a baby is bathed in the integrated bathing weighing unit and after the integrated bathing weighing unit is filled with the bathing medium.

Most preferably, the system further including a display and command subsystem communicating with the control and process subsystem to display information to a user and to receive inputs from the user. Preferably, the display and command system is adapted to be mechanically attached to the integrated bathing weighing unit. Typically, the display and command system is adapted to be detached from the integrated bathing weighing unit. The control and processing subsystem is adapted to be integrated within the display and command system.

According to the teachings of the present invention there is further provided a method of monitoring baby development utilizing an integrated bathing weighing unit having a container and a sensing arrangement associated with the container to provide data indicative of a weight of a body located within the container comprising the step of configuring the container as a fluid-tight bath liner and a base and locating an arrangement of sensors between the base and the bath liner. Most preferably, the method further includes the step of connecting a control and processing subsystem to the integrated bathing weighing unit to process signals within the integrated bathing weighing unit. Preferably, the method further includes the step of operating the sensors to provide data according to a sampling rate and wherein time stamp information is associated with respective weight measurement data.

Typically, substantially all weight measurement values obtained during a time period are stored and a spurious weight measurement value is determined from among other weight measurement values from the period. Typically, the other weight measurement values are considered as representative weight measurement values. Further typically, an averaged weight value is calculated from the representative weight measurement values and the averaged weight value is stored as the weight of the body, along with the time stamp information, thereby creating trend information.

BRIEF DESCRIPTION OF THE DRAWINGS

The invention is herein described, by way of example only, with reference to the accompanying drawings, wherein:

FIGS. 1A and 1B are a schematic cross sectional view of a baby bath development and weighing system and detailed views, in accordance with embodiments of the present invention;

DESCRIPTION OF THE PREFERRED EMBODIMENTS

The present invention is an economical baby bath development and weighing system, wherein a baby may be weighed while it is being bathed and wherein the weight of the baby may be monitored over time.

The principles and operation of a baby bath development and weighing system, according to the present invention may be better understood with reference to the drawings and the accompanying description.

Figure 2:
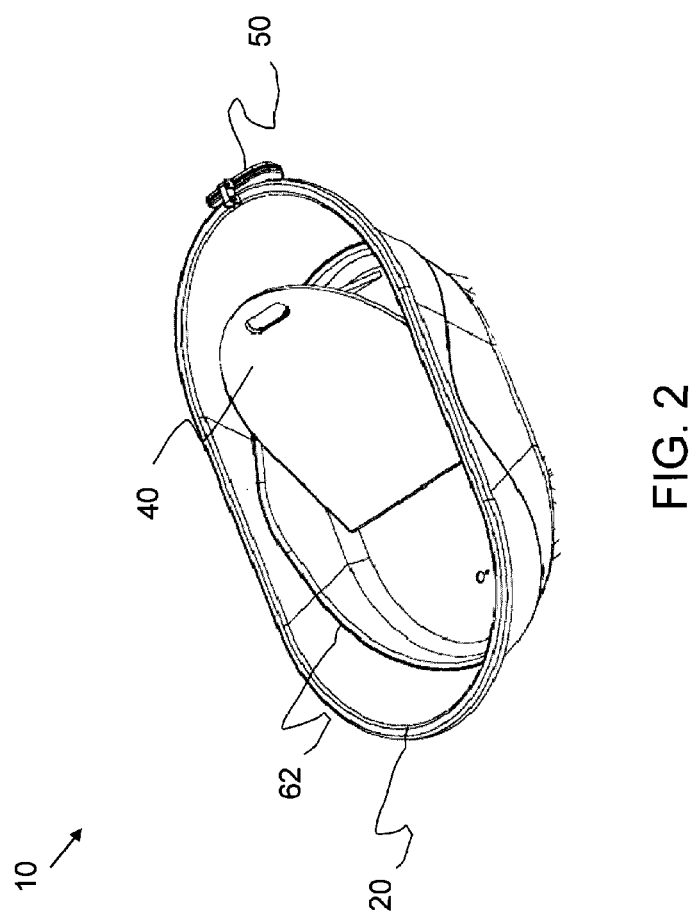
FIG. 2 is an illustrational view of the baby bath development and weighing system of FIGS. 1A and 1B.

Referring now to the drawings, FIGS. 1A, 1B, and 2 are schematic cross sectional views, detailed cross-sectional views, and illustrational views, respectively, of a baby bath development and weighing system 10, in accordance with embodiments of the present invention. Baby bath development and weighing system 10 includes an integrated bathing weighing unit 20. Integrated bathing weighing unit 10 has a base 24 and a watertight liner 25 spaced above the base. Liner 25 is typically filled with bath water 27, Typically, integrated bathing weighing unit 20 is supported from beneath base 24 by a rigid surface or support (not shown in the figure). Integrated bathing weighing unit 20 is typically fabricated from lightweight, watertight, economical, and strong materials such as, but no limited to, plastics and epoxy-resin composites.

Sensor arrangement 28 typically includes a number of load cells 30, each configured and fixed to the liner and to the base, within a respective enclosure space 32, as shown in both FIGS. 1A and 1B. In one embodiment of the present invention, shown in FIG. 1A, enclosure space 32 is formed by vertical struts 34, which are rigidly attached to the base, but which are not attached to liner 25. When integrated bathing weighing unit 20 is empty (i.e., no bath water nor a baby present), the load cell is configured so that vertical struts are close to or are in contact liner 25. When a load is present within integrated bathing weighing unit 20, such as when bath water 22 and the baby (not shown in the figure) are present within the unit, the load acts upon liner 25, and the load is transferred to load cell 30 and to the base, causing a displacement of vertical struts 34 away from liner 25. The liner and base are designed, knowing the characteristics of the type of load cell employed and the range of loads experienced in the integrated bathing weighing unit, to allow a small displacement of vertical struts 34 away from the liner. Typical loads in the integrated bathing weighing unit, including the bath water and/or the baby, can range from an equivalent weight of approximately 3 kg to approximately 20 kg. The load cell may thus be thus calibrated, as known in the art, so that an output signal from the load cell can accurately represents the range of loads noted hereinabove, thereby providing reliable and accurate weigh measurements. Furthermore, because the load cell continuously measures weight, a straightforward procedure, as noted hereinbelow, may be applied to accurately determine the baby weight, separately from the bath water in the integrated bathing weighing unit.

Near its periphery, base 24 sweeps upward to meet liner 25. An expansion flap 36, which is connected to the periphery of the liner, rests upon an upward sloping edge 38 of base 24, thus protecting from foreign material and/or water entering a space 39 between the liner and the base.

In another embodiment of the present invention, as shown in FIG. 1B, enclosure space 32 is formed by vertical struts 34, which are rigidly attached to liner 25 and to the base. When a load is present within integrated bathing weighing unit 20, such as when bath water 22 and a baby (not shown in the figure) are present within the unit, the load acts upon liner 25, and the load is transferred to load cell 30 and to the base. In this embodiment, the load cell may thus be thus calibrated, as known in the art, so that the load cell output signal accurately represents a range of loads acting upon it, thereby providing reliable and accurate weigh measurements.

Any configuration allowing a relative displacement of approximately 1 mm between the liner and the base, as exemplified in the embodiments shown in FIG. 1A and FIG. 1B, is necessary so that the small displacement occurs when the load acts upon the load cell. One exemplary load cell which may be used in embodiments of the present invention include, but is not limited to, Model 3091 Load Cell, TECSIS GmbH, Carl-Legien-Str. 40, D-63073 Offenbach/Main.

Bath water 22 may be drained from integrated bathing weighing unit 20 through drain holes 41a and b, respectively provided in liner 25 and base 24, as shown in the figure. One embodiment of the present invention employs a toroidal seal 43, which is bonded to and fixed between liner 25 and base 24, at holes 41a and 41b, thus ensuring no water flows between the liner and the base and also serving to mechanically connect and space between the liner and the base connection/spacer. A drain hose 48 is connected the base at hole 41b, thus allowing bath water 22 to be drained conveniently. When drainage is not desirable, such as when bath water 22 is present in the integrated bathing weighing unit and upon bathing the baby, drain 41a may be stopped or drain hose 48 may be crimped or plugged mechanically. Additionally or alternatively, an electrically powered solenoid (not shown in the figure) may be installed (for example, integrated into toroidal seal 43) to control drainage through drain 41a.

Other embodiments of the present invention may employ additional or other structures, similar in function to that of toroidal seal 43, which serve to mechanically connect and space liner 25 and base 24. Temperature measurement of bath water 22 may be accomplished by using one or more sensors (not shown in the figure) respectively placed in respective enclosure space 32 or near drain hole 41a. Examples of temperature sensors include, but are not limited to: thermocouples, thermistors, or other compact devices known in the art.

Baby support 40 is located within integrated bathing weighing unit 20 and the baby support may be positioned as shown in the figure to allow the baby to be supported, with its head well above the bath water level during bathing. Baby support 40 is maintained in position by support legs (not shown in the figure). Additionally or alternatively, the baby support may be totally reclined and stowed against the liner, or the baby support may be completely removed from the integrated bathing weighing unit to allow a larger baby more room for bathing. Ridge 62 runs completely around the periphery of integrated bathing weighing unit 20. The ridge serves a number of purposes, such as: mechanically strengthening the integrated bathing weighing unit; acting as a decoration and stacking guide (described hereinbelow); and serving as a conduit for any necessary wiring and additional electronics systems that are sealed and protected around the periphery of the integrated and bathing unit. Examples of additional electronic systems that may be located within ridge 62 include, but are not limited to, are: a control and processing subsystem (not shown in the current figure) described hereinbelow, and connection wires, such as from load cells and/or temperature sensors to the control and processing subsystem.

Figure 3B:
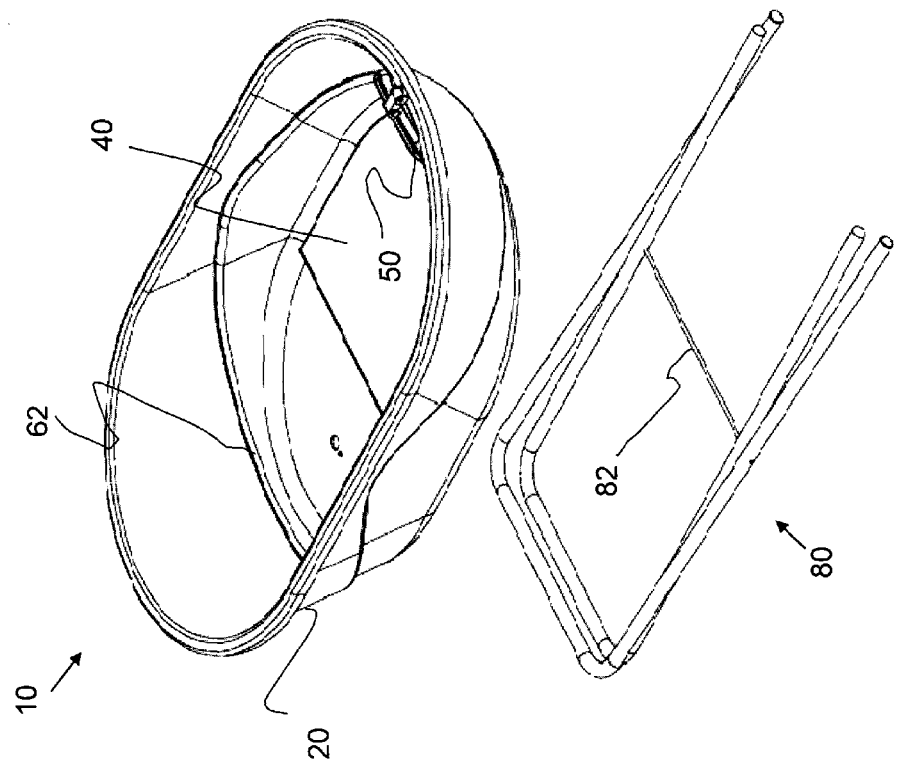
FIGS. 3A and 3B are illustrational views of the baby bath development and weighing system, with a dual leg support, in accordance with an embodiment of the present invention.
Figure 3A:
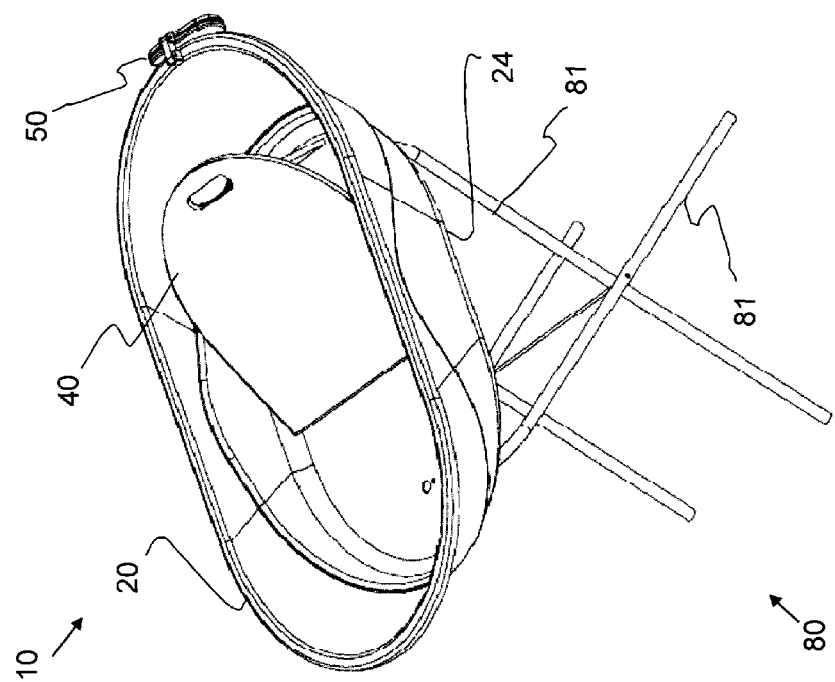

Reference is now made to FIGS. 3A and 3B which are illustrational views of the baby bath development and weighing system, with a dual leg support 80, in accordance with an embodiment of the present invention. Apart from differences described below, elements indicated by the same reference numerals of previous figures are generally identical in configuration and operation. In FIG. 3A, integrated bathing weighing unit 20 is supported, beneath base 24, by a dual leg support 80, which is deployed to support the unit. (Base 24 may have specially prepared indentations to allow the foldable leg support Dual leg support includes two "U" shaped leg members 81 which are joined by a cross-bar 82, as is known in the art. When stowed, dual leg support 80 has both "U" shaped leg members folded together, as shown in FIG. 3B. Typically, the dual leg support is fabricated of steel or aluminum tubing and the cross bar is typically formed from steel rod, however any materials, which will allow the support to stably support a weight of approximately 25 kg., may be used. Alternatively or optionally, dual leg support 80 may be replaced by a cart or other support (not shown in the figures) which will stably support integrated bathing weighing unit 20 as noted above.

Figure 4:
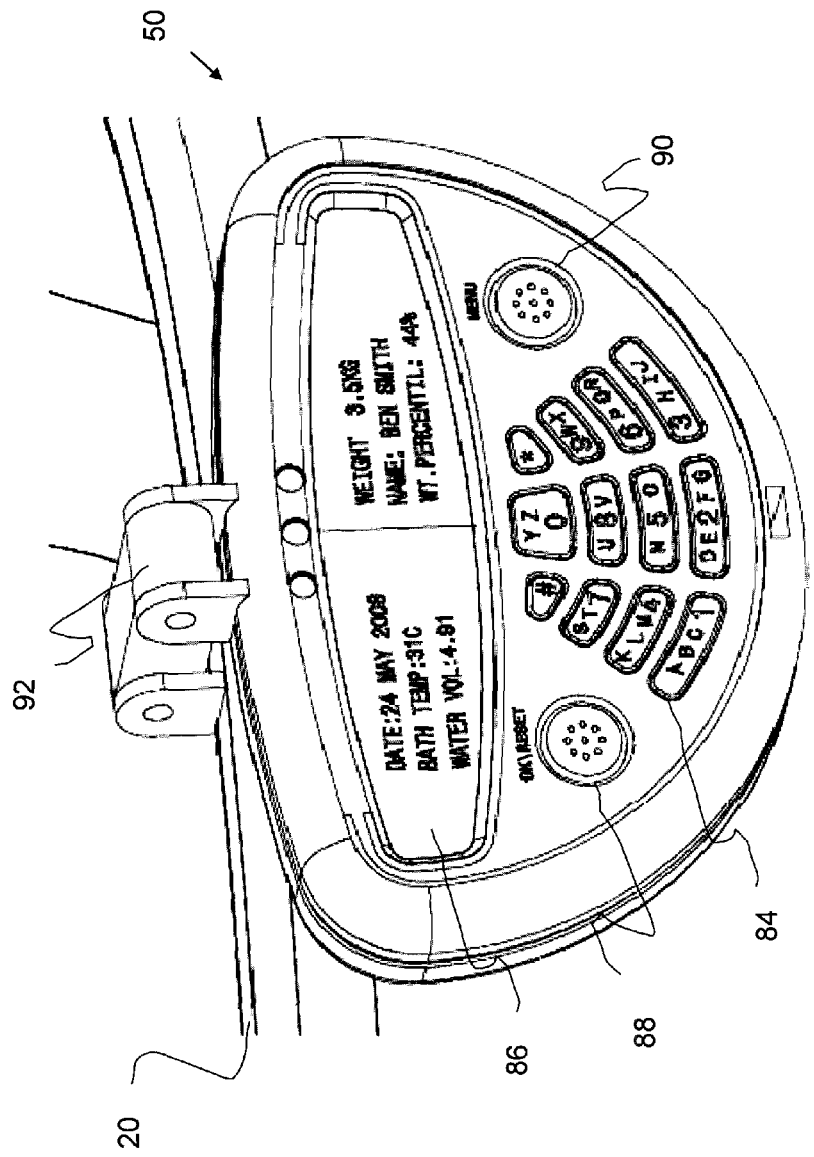
FIG. 4 is an illustrational view of the display and command subsystem, in accordance with an embodiment of the present invention.

Reference is now made to FIGS. 4, 4A, and 4B, which are illustrational views of display and command subsystem 50, in accordance with an embodiment of the present invention. Apart from differences described below, elements indicated by the same reference numerals of previous figures are generally identical in configuration and operation. The display and command subsystem is connected (by wired or wireless means) to the control and processing subsystem (not shown), which includes a processor, a memory, power management subsystem, and may include necessary signal processing and transceiver components. In addition, on-board power, typically in the form of batteries (which may be recharged or replaced) is managed by the control and processing subsystem. In general, the control and processing subsystem processes inputs to, outputs from, and signals within the integrated weighing unit. One or more components of the control and processing subsystem may be located in display and command subsystem 50 and/or may be distributed within integrated bathing weighing unit 20.

Figure 5B:
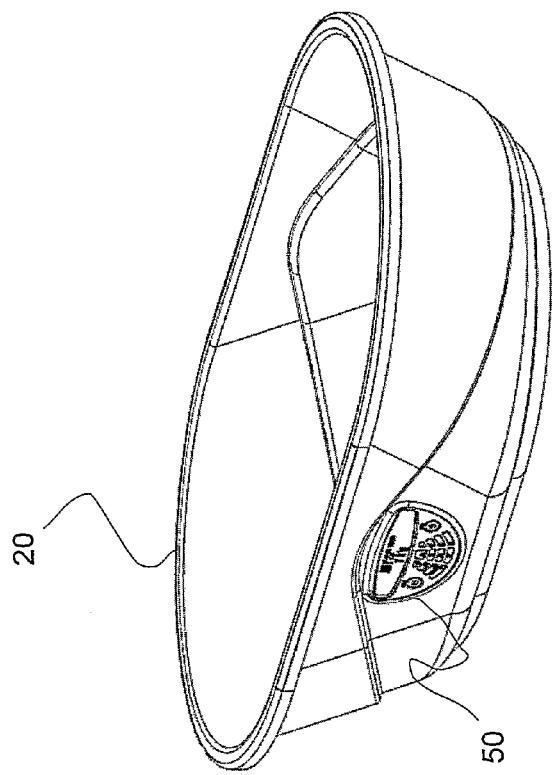
FIGS. 5A and 5B are illustrational views of the display and command subsystem in accordance with embodiments of the present invention.
Figure 5A:
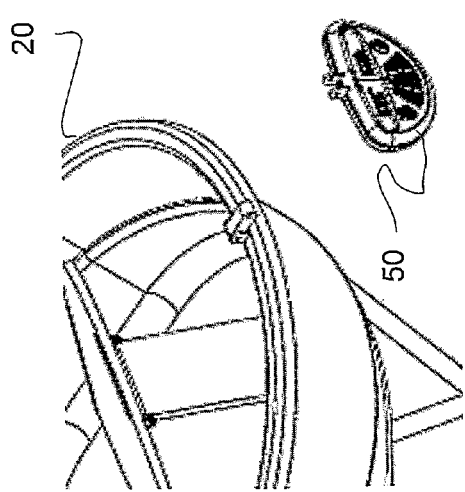

Display and command subsystem 50 displays information to a parent or other user of the baby bath development and weighing system, in addition to receiving inputs and commands from the user. Display and command subsystem 50 includes: a data entry keyboard 84, a display screen 86, an on/off confirm control button 88 (indicated as "OK/RESET" in the figure), a menu button 90, and a connector bracket 92. Functioning of the on/off confirm control button 88 and menu button, along with the overall logic flow of using the display and command subsystem, are described hereinbelow. Connector bracket 92 allows the display and command subsystem to be swiveled and maintained outside of integrated bathing weighing unit 20 when bathing the baby, for example, or to be swiveled and stowed inside of the integrated bathing unit, for example, when the bathing unit is empty, dry, and not used. Alternatively or additionally, connector bracket 92 may be disconnected, allowing display and command subsystem 50 to be detached from integrated bathing weighing unit 20, as shown in FIG. 5A, such as when the display and command subsystem is used in a wireless remote mode. In another embodiment, display and command subsystem 50 may be attached along or integrated in a side of integrated bathing weighing unit 20, as shown in FIG. 5B. Data displayed on display and command subsystem 50 is further discussed hereinbelow.

Figure 6:
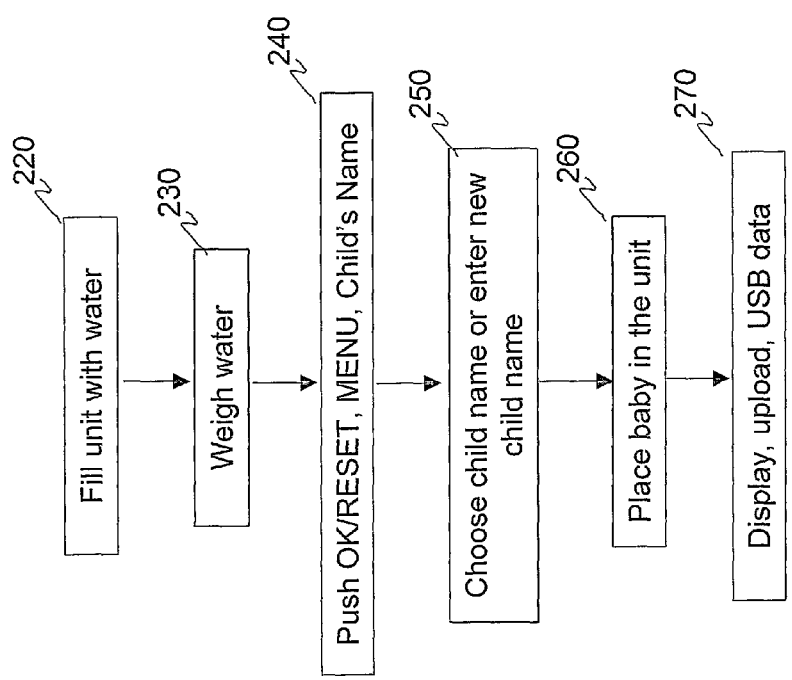
FIG. 6 is a flow diagram of the sequence of operations and use of the baby bath development and weighing system, in accordance with an embodiment of the present invention.

Reference is now made to FIG. 6, which is a flow diagram of the sequence of operations and use of the baby bath development and weighing system, in accordance with an embodiment of the present invention. After preparing the system as necessary, cleaning, for example (not indicated in the figure) in step 220, the system is filled with water. Typically, care is taken, as with any baby bathing procedure, to maintain a comfortable water temperature for the baby. The bath water is weighed in step 230, Weigh water. Part of this step involves activating the entire system, by pressing the OK/RESET button on display and command subsystem 50, further described in detail hereinbelow. (Subsequent commands are also entered, as necessary, on the display and command subsystem.) Once the system is activated, the load sensors begin to continuously function with a sampling rate of at least once per 5 seconds and typically much shorter. Therefore, waiting approximately 10 seconds will provide sufficient time for many weight measurements, but at least two weight measurements to be performed, averaged, and subsequently recorded. At this point, the weight of the water in the bath is known and the value is used to subtract from subsequent measurements, for example after the child is placed in the system. If temperature sensors are present, continuous temperature sensing of the bath water is initiated and bath water temperature values are displayed on the display and command system. In step 240, the OK/RESET button is pressed, which indicates to the system that the measurements previously made by the load sensors are attributed to the bath water.

Then the MENU button is pressed and "Child's Name" is chosen. ("Choosing" is confirmed by pressing the OK/RESET button. Details of the Menu functions are described in FIG. 7.) In step 250, a child's name is entered into the system. The user may either specify a child's name already entered into the system (to continue to measure and record weight measurements of a child already measured before) or the user may specify a new child name, such as when a child is first weighed in the system. Additional inputs, such as the baby's birth date and other notes may be entered at this step. In step 260, the baby is placed in the unit. Load sensors continuously measure the weight of the bath water and of the baby at a frequency noted hereinabove. Baby weight is calculated by the system, knowing the bath water weight (from step 230 above) and by subtracting the bath water weight from the presently measured weight. Measured baby weights are continuously recorded by the system while bathing the baby, so that typically, there may be a series of at least 30 or more measurements made during the bathing session. Should there be some momentary change, such as the baby being lifted up or should the baby move, as a specific measurement is made the measurement reflecting this activity will be significantly different as compared with other measurements. Once the bathing session is complete, the system has the capability of determining and flagging individual spurious measurements, thereby providing physiologically related—and not event-related—weight measurements. For example, individual weight measurements during a specific bathing session (after when the bath water measurements were completed and before the baby is removed from the bath) may be statistically compared against the mean or other significant statistical parameter of all weight measurements during the specific bathing session, and the resultant difference value compared against a predetermined spurious threshold value. In this way, only the most representative measurements are maintained. An average value is calculated from the representative measurements and the averaged value is recorded as the baby weight of the present specific bathing session, at step 270, when the user chooses an output method, including display on the display and command subsystem 50, upload to a remote device (by wireless or wired methods), or download, such as to a USB device.

Recorded averaged baby weight measurements are maintained in memory, along with the corresponding date and time, providing a "time stamp" function. Population-wide historical weight versus age information, previously downloaded to the system (details of which are described in more detail hereinbelow) is compared against the present baby weight and age (calculated from the baby's birth date and the present date) and the baby's percentile is determined. When, in step 270, display, upload, or USB are chosen, the present date, bath water temperature, water volume, present weight, baby name, and calculated weight percentile are available for display, upload, and USB transfer. These data may be recorded onboard baby bath development and weighing system 10. Alternatively or additionally, these data may recorded at a remote location and development graphs may be prepared to graphically display baby development over periods of weeks and months. At this point, the baby is typically removed from the system and the bath water may be drained from integrated bathing weighing unit 20.

Figure 7:
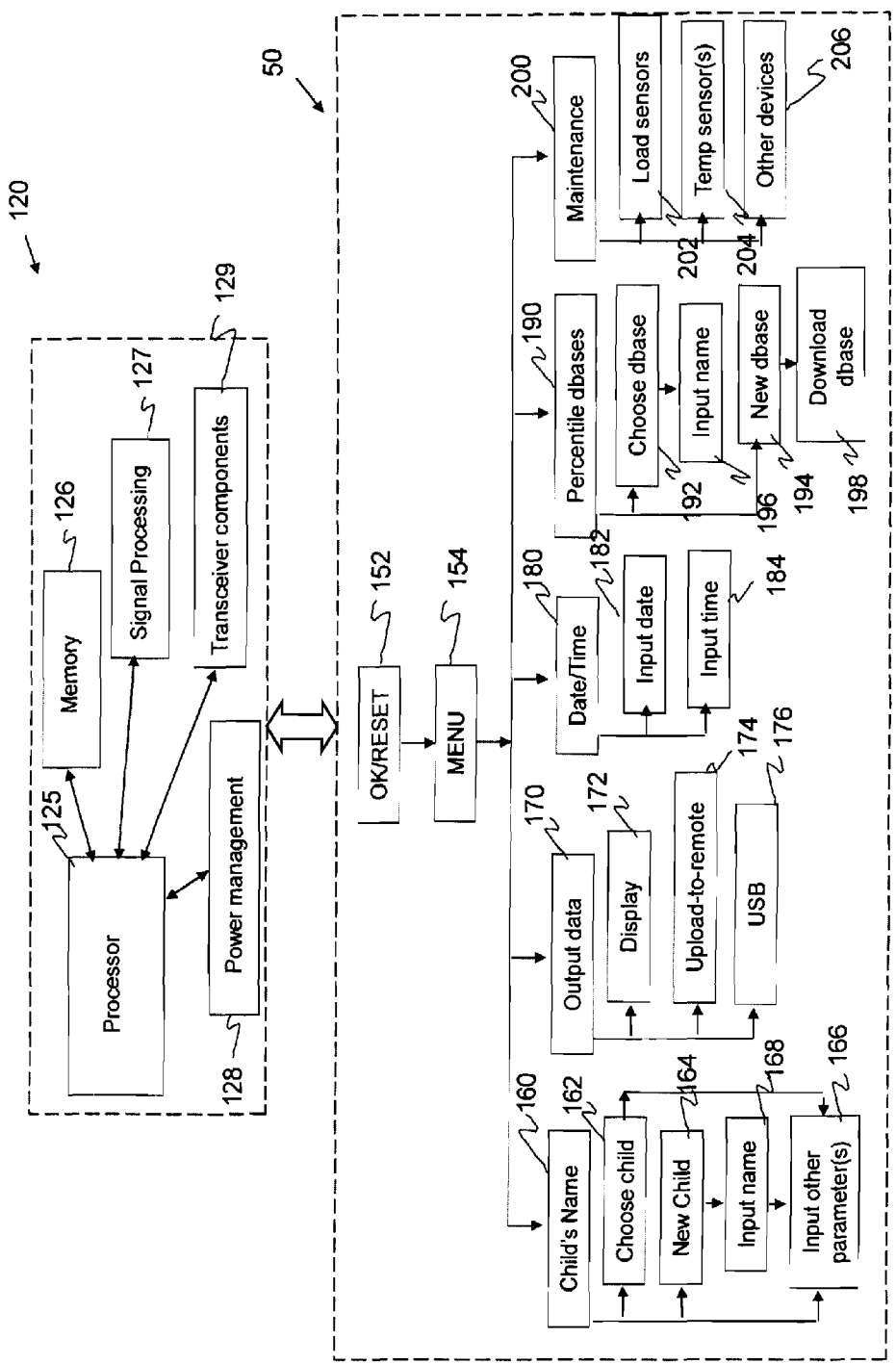
FIG. 7 is a flow diagram of the logic of the display and command subsystem, in accordance with an embodiment of the present invention.

Reference is now made to FIG. 7, which is a block diagram of a control and processing subsystem 120 and display and command subsystem 50, including a menu flow diagram for the display and command system, in accordance with an embodiment of the present invention. Apart from differences described below, elements indicated by the same reference numerals of previous figures are generally identical in configuration and operation. As noted previously, the control and processing subsystem processes inputs to, outputs from, and signals within the integrated weighing unit, and as such coordinates functioning with display and command subsystem 50. One or more components of the control and processing subsystem may be located in display and command subsystem 50 and/or may be distributed within integrated bathing weighing unit 20.

Control and processing subsystem 120 includes a processor 125, memory 126, signal processing components 127, power management subsystem 128, and transceiver components 129. Generally, processor 125 coordinates functioning and activities of the other components and subsystems. Memory 126 maintains individual child historical weight data as well as population databases which have been downloaded to the system. Signal processing components 127 handle an interpret input and output signals to/from the systems. Power management subsystem 128 is responsible for monitoring and indicating battery power for the system. Batteries (not shown in the figures) may be replaced as necessary, as the system is designed for continuous use of typically one month, using one set of batteries. In an alternative embodiment of the present invention, mains power may be used to recharge batteries. Transceiver components 129 handle wireless transmission and receiving function from and to the system. As noted hereinabove, control and processing subsystem 94 may be physically located within the enclosure of display and command subsystem 50 or the control and processing subsystem may be located elsewhere in baby bath development and weighing system 10.

Display and command subsystem 50 has the following major menu/logic functions, corresponding to buttons and/or display titles of the display and command subsystem: OK/RESET 152, used to activate and to acknowledge inputs and or choices on the display to acknowledge system queries; MENU 154, to specify detailed menu choices; Child's name 160, to choose or input a child's name and other additional parameters; Output data 170, to choose and output data; Date/Time 180, to input date and/or time; Percentile databases 190, to specify and/or download/load a historical population database; and Maintenance 200, to checkout and/or operate devices within the baby bath development and weighing system.

Specific functions and menu choices are as described hereinbelow. Under Child's Name 160, the user may select Choose child 162, to select a child's name (and the child's associated historical weight information) or select New Child 164 to input a new child's name, by then choosing Input name 168. In addition, whether an existing child or a new child name is used, the user may wish to Input other parameters 166, such as child's birth date, present length and other comments. Under Output data 170, the user may choose one or more of the following options: Display 172 (the default mode, whereby the most recent weight measurement and time are displayed by the display and command subsystem 50; Upload-to-remote 174 (to utilize a wireless method of upload, for example); USB 176 (to utilize a wired method of upload, such as with a USB connection). Outputting data may be typically performed after a weighing/bathing session. Under Date/Time 180, choices are Input date 182 and Input time 184. Date and time values are stored by the system and updated by a clock function (not shown in the figure) within the processor. Date/Time 180 may be used to update and/or input date and time values to the system, such as when initializing the system. Under Percentile dbases 190, the user may choose to: Choose an existing d(ata)base 192, whereupon Input name 196 is used to specify an existing database name, or; New d(ata)base 194, whereupon a new name is then specified and the Download d(ata)base 198 is chosen. Under Maintenance 200, in order to debug and/or checkout functioning of various sensors and devices within the system; the following menu items are provided: Load sensors 202; Temp sensor(s) 202; and Other devices 206 (to debug and checkout devices such as drain solenoid and/or other electromechanical devices added to the system).

Figure 8:
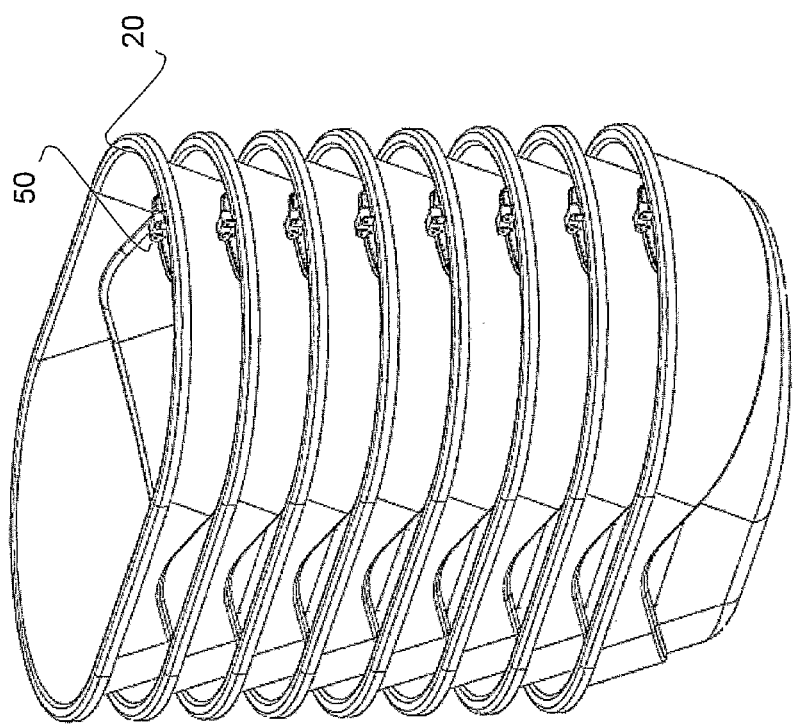
FIG. 8 is an illustrational view of a plurality of baby bath development weighing systems in a compact, shipment mode, in accordance with an embodiment of the present invention.

Components and materials used throughout and the overall construction of embodiments of the present invention allow the baby bath development and weighing system to be mass produced economically. Reference is made to FIG. 8, which is an illustrational view of a plurality of baby bath development weighing systems in a compact, shipment mode, in accordance with an embodiment of the present invention. Apart from differences described below, elements indicated by the same reference numerals of previous figures are generally identical in configuration and operation. Integrated bathing weighing units 20 are seen with stowed display and command subsystems 50 are shown in a compact, stacked configuration for storage and shipment, as part of a typical manufacturing stage. Additionally, lightweight construction of the integrated bathing weighing units and its components contribute to reducing transport costs of the units.

It will be appreciated that the above descriptions are intended only to serve as examples, and that many other embodiments are possible within the scope of the present invention as defined in the appended claims.

What is claimed is:

1. Apparatus, comprising:
a bath for filling with water and bathing a baby;
at least one weight sensor, which is coupled to the bath so as to produce weight measurements of the bath; and
a control unit, which is configured to estimate a weight of the baby based on the weight measurements of the entire bath that are produced by the weight sensor while the water is present in the bath.

2. The apparatus according to claim 1, wherein the control unit is configured to acquire a first weight measurement from the weight sensor while the water is present but the baby is not present in the bath, to acquire a second weight measurement from the weight sensor while both the water and the baby are present in the bath, and to estimate the weight of the baby based on the first and second weight measurements.

3. The apparatus according to claim 2, wherein the control unit is configured to acquire the first and second weight measurements in response to respective first and second inputs from a user.

4. The apparatus according to claim 2, wherein the control unit is configured to acquire and average multiple first weight measurements while the water is present but the baby is not present in the bath, and to acquire and average multiple second weight measurements while both the water and the baby are present in the bath, and to estimate the weight of the baby based on the first and second averaged weight measurements.

5. The apparatus according to claim 1, wherein the control unit is configured to compute multiple estimates of the weight of the baby, and to discard at least one of the estimates that statistically deviates from the multiple estimates.

6. The apparatus according to claim 1, wherein the control unit is configured to collect and record multiple estimates of the weight of the baby that are measured at multiple respective times.

7. The apparatus according to claim 1, wherein the control unit is configured to assess and output a developmental characteristic of the baby based on the estimated weight.

8. The apparatus according to claim 1, wherein the control unit is configured to output the estimated weight to an external device.

9. The apparatus according to claim 1, and comprising a remote display unit, wherein the control unit is configured to transmit the estimated weight to the remote display unit for display to a user.

10. A method, comprising:

using at least one weight sensor that is attached to a bath used for bathing a baby, producing weight measurements of the entire bath while water is present in the bath; and estimating a weight of the baby based on the weight measurements of the bath.

11. The method according to claim 10, wherein producing the weight measurements comprises acquiring a first weight measurement while the water is present but the baby is not present in the bath, and acquiring a second weight measurement while both the water and the baby are present in the bath, and wherein estimating the weight comprises assessing the weight of the baby based on the first and second weight measurements.

12. The method according to claim 11, wherein producing the weight measurements comprises acquiring the first and second weight measurements in response to respective first and second inputs from a user.

13. The method according to claim 11, wherein producing the weight measurements comprises acquiring and averaging multiple first weight measurements while the water is present but the baby is not present in the bath, and acquiring and averaging multiple second weight measurements while both the water and the baby are present in the bath, and wherein estimating the weight comprises assessing the weight of the baby based on the first and second averaged weight measurements.

14. The method according to claim 10, wherein estimating the weight comprises computing multiple estimates of the weight of the baby, and discarding at least one of the estimates that statistically deviates from the multiple estimates.

15. The method according to claim 10, wherein estimating the weight comprises collecting and recording multiple estimates of the weight of the baby that are measured at multiple respective times.

16. The method according to claim 10, and comprising assessing and outputting a developmental characteristic of the baby based on the estimated weight.

17. The method according to claim 10, and comprising outputting the estimated weight to an external device.

18. The method according to claim 10, and comprising transmitting the estimated weight to a remote display unit, and displaying the estimated weight to a user on the remote display unit.

* * * * *